United States Patent
Hsu

(10) Patent No.: US 9,624,704 B1
(45) Date of Patent: Apr. 18, 2017

(54) PIVOT PIN DEVICE

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 15/081,152

(22) Filed: Mar. 25, 2016

(51) Int. Cl.
| | | |
|---|---|---|
| *E05D 11/10* | (2006.01) | |
| *E05D 3/06* | (2006.01) | |
| *E05D 3/18* | (2006.01) | |
| *E05D 5/10* | (2006.01) | |
| *E05D 5/06* | (2006.01) | |
| *E05D 3/12* | (2006.01) | |
| *H05K 5/02* | (2006.01) | |
| *G06F 1/16* | (2006.01) | |
| *H04M 1/02* | (2006.01) | |

(52) U.S. Cl.
CPC .............. *E05D 3/18* (2013.01); *E05D 3/12* (2013.01); *E05D 5/06* (2013.01); *E05D 5/10* (2013.01); *H05K 5/023* (2013.01); *E05D 2005/102* (2013.01); *E05D 2005/106* (2013.01); *E05Y 2900/606* (2013.01); *G06F 1/1681* (2013.01); *H04M 1/0216* (2013.01)

(58) Field of Classification Search
CPC .... E05D 3/12; E05D 3/06; E05D 3/10; E05D 3/18; E05D 3/122; E05D 11/06; E05D 2011/0072; E05D 11/0054; G06F 1/1681; G06F 1/1616; G06F 1/1618; E05Y 2900/606; H04M 1/0216; H04M 1/0222; H04M 1/022; Y10T 16/54038; Y10T 16/5403; Y10T 16/54033; Y10T 16/5404; Y10T 16/5406; Y10T 16/544; Y10T 16/547; Y10T 16/5474; Y10T 16/5475
See application file for complete search history.

(56) References Cited

U.S. PATENT DOCUMENTS

| | | | | |
|---|---|---|---|---|
| 6,108,868 | A * | 8/2000 | Lin ................. | G06F 1/1616 16/327 |
| 8,607,415 | B2 * | 12/2013 | Bestle ............. | G06F 1/1616 16/281 |
| 8,713,757 | B2 * | 5/2014 | Chen .............. | G06F 1/1616 16/327 |
| 9,021,658 | B1 * | 5/2015 | Yang .............. | G06F 1/1681 16/366 |

(Continued)

*Primary Examiner* — Chuck Mah
(74) *Attorney, Agent, or Firm* — Rosenberg, Klein & Lee

(57) ABSTRACT

A pivot pin device provides a protection system. In operation/rotation, the pivot pin device achieves a height/position change effect. The pivot pin device includes a first component, a fixing shaft disposed on the first component and a second component assembled with the fixing shaft. The second component is formed with a slot for assembling with the fixing shaft. The fixing shaft is assembled with a rocking arm. A first head end of the rocking arm is pivotally connected with an eccentric shaft. A second head end of the rocking arm is pivotally connected with a subsidiary shaft assembled on the second component. When the slot of the second component is rotated around the fixing shaft to an opened position, the subsidiary shaft drives the rocking arm to swing with the eccentric shaft as a fulcrum, whereby a height/position change is achieved between the first and second components.

33 Claims, 7 Drawing Sheets

(56) References Cited

U.S. PATENT DOCUMENTS

| | | | |
|---|---|---|---|
| 2007/0028419 A1* | 2/2007 | Lu | F16M 11/10 16/366 |
| 2007/0151079 A1* | 7/2007 | Lu | G06F 1/1601 16/337 |
| 2008/0052875 A1* | 3/2008 | Lee | G06F 1/1616 16/382 |
| 2008/0109995 A1* | 5/2008 | Kuwajima | H04M 1/022 16/354 |
| 2009/0000062 A1* | 1/2009 | Yamanami | G06F 1/1616 16/366 |
| 2009/0013500 A1* | 1/2009 | Ueyama | G06F 1/1616 16/354 |
| 2010/0149764 A1* | 6/2010 | Ueyama | G06F 1/1681 361/749 |
| 2011/0265288 A1* | 11/2011 | Chiang | G06F 1/1681 16/341 |
| 2011/0289726 A1* | 12/2011 | Zhang | G06F 1/1681 16/250 |
| 2012/0047685 A1* | 3/2012 | Ma | G06F 1/1681 16/319 |
| 2012/0192381 A1* | 8/2012 | Zhang | G06F 1/1681 16/366 |
| 2014/0352113 A1* | 12/2014 | Chen | H04M 1/022 16/366 |
| 2015/0013107 A1* | 1/2015 | Shin | E05D 3/06 16/366 |
| 2015/0040353 A1* | 2/2015 | Chen | G06F 1/1681 16/366 |
| 2016/0138310 A1* | 5/2016 | Chuang | E05D 11/1078 16/319 |
| 2016/0230436 A1* | 8/2016 | Ahn | G06F 1/16 |

* cited by examiner

PIVOT PIN DEVICE

BACKGROUND OF THE INVENTION

1. Field of the Invention

The present invention relates generally to a pivot pin device, and more particularly to a pivot pin device including an assembly of a fixing shaft, an eccentric shaft, a rocking arm and a subsidiary shaft. In operation/rotation, the pivot pin device achieves a height/position change effect to set up a protection system.

2. Description of the Related Art

There are various electronic apparatuses provided with covers or display screens, such as mobile phones, notebooks, PDA, digital image capturing devices and electronic books. The covers, display screens or viewers are pivotally mounted on the electronic apparatuses via pivot pins or rotary shafts, whereby the covers or display screens can be freely rotated and opened/closed under external force.

With respect to the operation and structural design of these pivot pin devices, the display of the pivot pin device is often rotatable/openable by at least 180 degrees. Therefore, in practice, in operation, a user often makes the display hit a table face or some other hard faces (or objects) due to negligence or incaution.

Such situation will lead to damage of the display or scrape of the surface of the display. This is not what we expect.

The conventional rotary shaft and the relevant connection components thereof have the above shortcoming in use and structural design that need to be overcome. It is therefore tried by the applicant to provide a pivot pin device to solve the above problem in the following manners:
1. The pivot pin device and the relevant components/ structures thereof are redesigned to change the use form of the conventional pivot pin device and widen the application range thereof. In addition, in practice, the safety in operation of the pivot pin device is enhanced.
2. Furthermore, the pivot pin device is such structurally designed that when the display is operated/rotated, the relative height or position of the display is automatically changed to set up a protection or safety system. This eliminates the shortcoming of the conventional pivot pin device that in operation, due to negligence or incaution, the display often hits the table face or some other hard objects.

SUMMARY OF THE INVENTION

It is therefore a primary object of the present invention to provide a pivot pin device. In operation/rotation, the pivot pin device achieves a height/position change effect to set up a protection system. The pivot pin device includes a first component, a fixing shaft disposed on the first component and a second component assembled with the fixing shaft. The second component is formed with a slot for assembling with the fixing shaft. The fixing shaft is assembled with a rocking arm. A first head end of the rocking arm is pivotally connected with an eccentric shaft. A second head end of the rocking arm is pivotally connected with a subsidiary shaft assembled on the second component. When the slot of the second component is rotated around the fixing shaft to an opened position, the subsidiary shaft drives the rocking arm to swing with the eccentric shaft as a fulcrum, whereby a height/position change is achieved between the first and second components. This improves the shortcoming of the conventional pivot pin device that when operating and opening the display, due to negligence or incaution, the display is apt to hit the table face or be scraped by some other hard objects.

In the above pivot pin device, the second component has an extension section. The extension section of the second component is formed with a pivot hole and the slot. The pivot hole is for pivotally connecting with the subsidiary shaft. The slot is defined with a first position and a second position. When operating/rotating the second component, the fixing shaft is permitted to relatively move between the first and second positions of the slot. A fixing disc is disposed on the fixing shaft. The fixing disc has an eccentric hole for pivotally connecting with the eccentric shaft, whereby the second head end of the rocking arm is permitted to swing with the eccentric shaft serving as a fulcrum of the first head end of the rocking arm.

In the above pivot pin device, a first fixing plate and a second fixing plate are disposed on two sides of the extension section of the second component. The first and second fixing plates are respectively formed with guide slots and shaft holes. The subsidiary shaft is assembled in the guide slots. Each of the guide slots of the first and second fixing plates is defined with a first position and a second position. When the rocking arm swings, the subsidiary shaft is permitted to relatively move between the first and second positions of the guide slots. The fixing shaft is pivotally connected in the shaft holes of the first and second fixing plates, whereby the first and second fixing plates can rotate around the fixing shaft along with the motion of the rocking arm.

The present invention can be best understood through the following description and accompanying drawings, wherein:

DETAILED DESCRIPTION OF THE PREFERRED EMBODIMENTS

Figure 1:
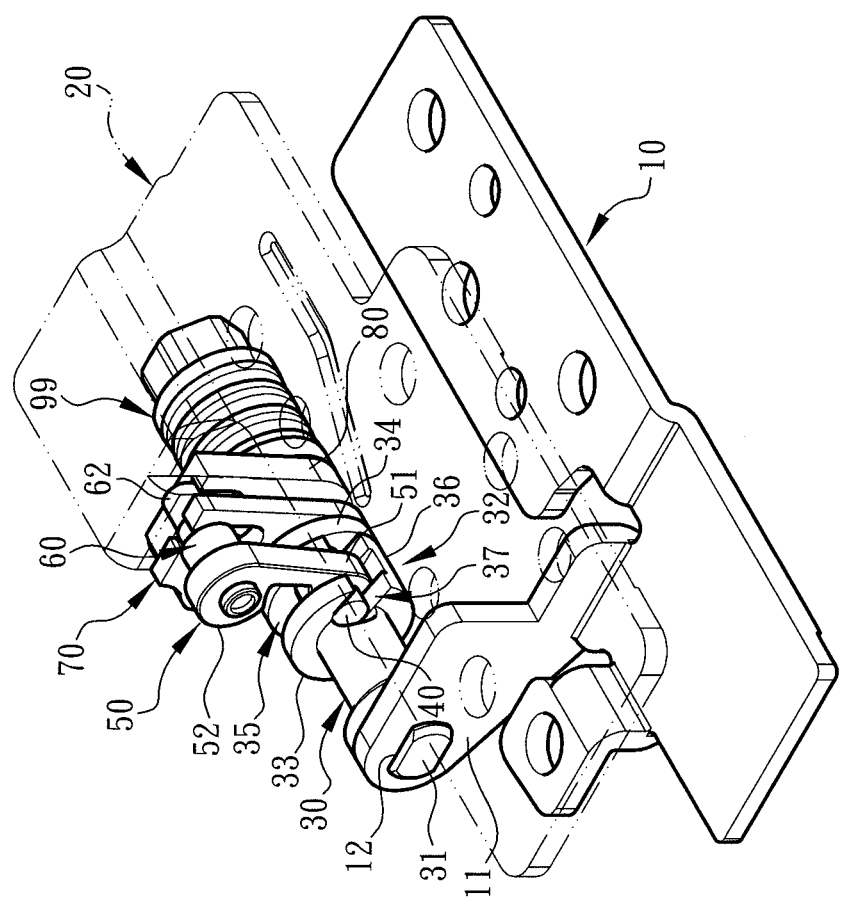
FIG. 1 is a perspective assembled view of the present invention, showing the assembly of the first component, the second component, the fixing shaft, the rocking arm, the subsidiary shaft, the eccentric shaft, the first fixing plate and the second fixing plate.
Figure 2:
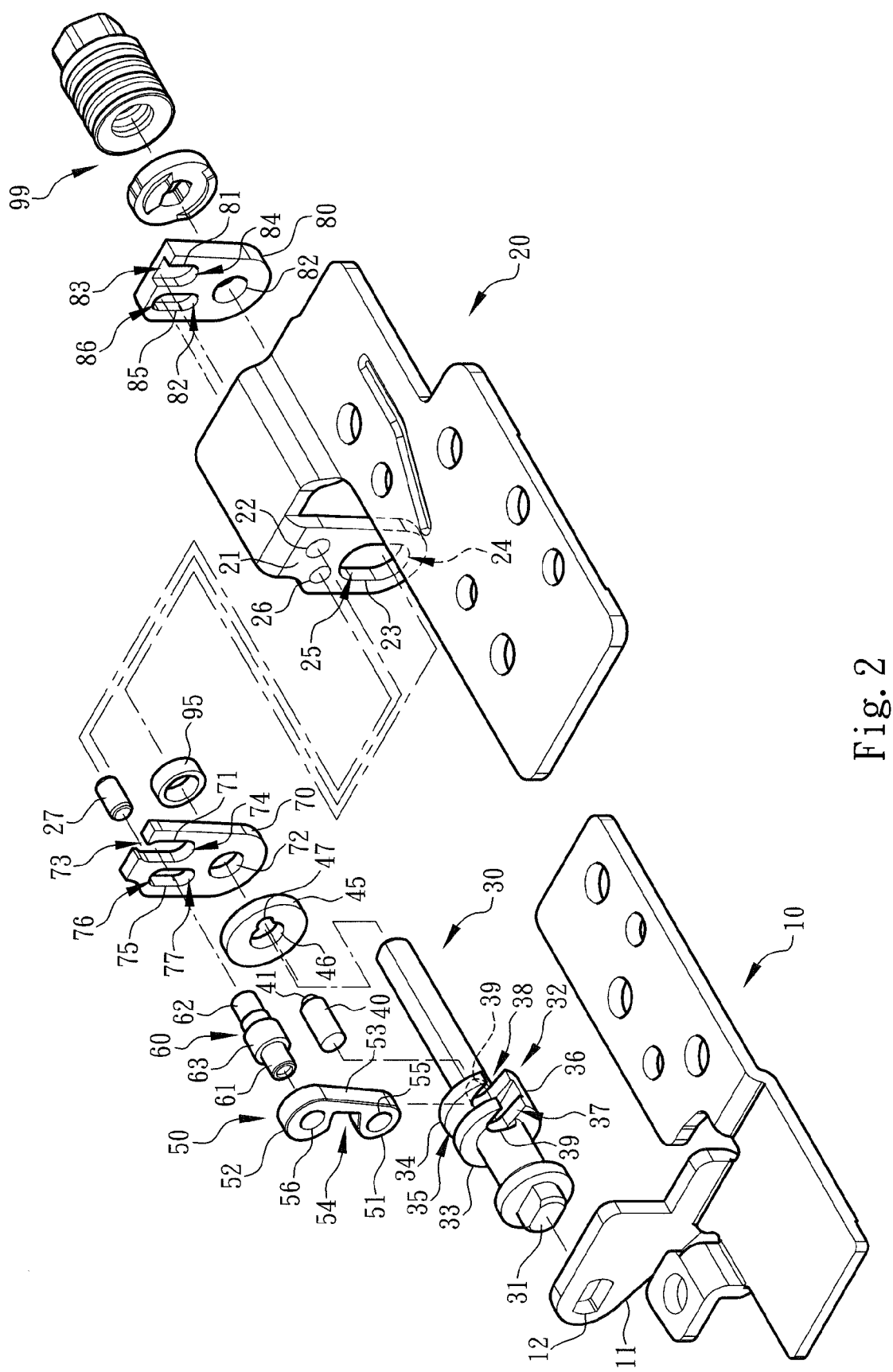
FIG. 2 is a perspective exploded view of the present invention, showing the structures and relative positions of the first component, the second component, the fixing shaft, the rocking arm, the subsidiary shaft, the eccentric shaft, the first fixing plate and the second fixing plate.
Figure 3:
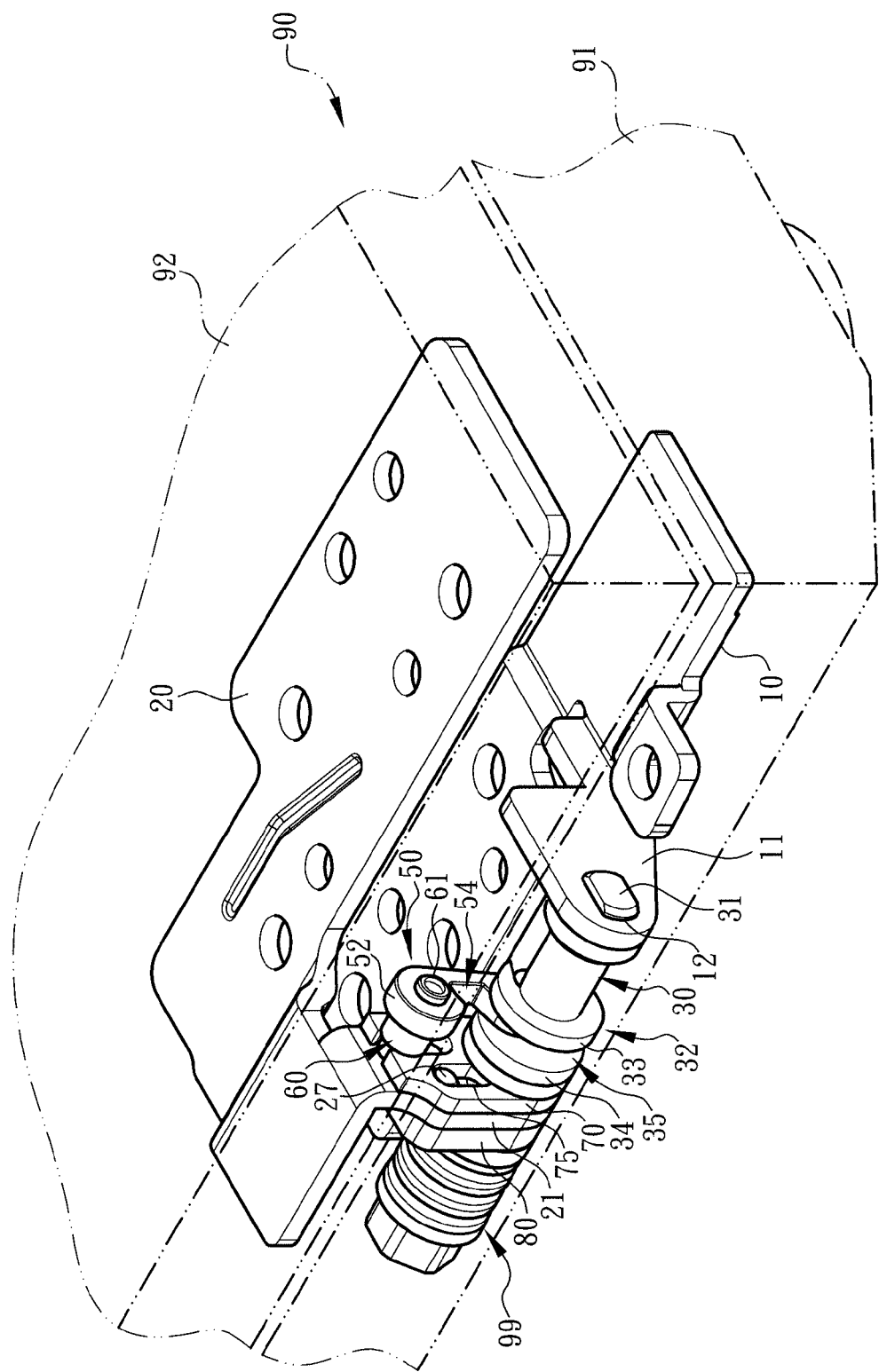
FIG. 3 is a perspective assembled view of the present invention, showing that the first component and the second component are respectively assembled with the display module and the apparatus body module and positioned in a zero-degree position in a closed state.

Please refer to FIGS. 1, 2 and 3. The pivot pin device of the present invention includes a first component 10 and a second component 20. The first and second components 10, 20 can be respectively mounted on the apparatus body module 91 and the display module 92 (such as a cover or a display screen) of an electronic apparatus 90 (such as a tablet). When a user operates the display module 92 and turns open the display module 92 from the apparatus body module 91 or closes the display module 92 onto the apparatus body module 91, the display module 92 of the electronic apparatus 90 will drive the second component 20 to rotate.

FIGS. 1, 2 and 3 show that the first component 10 is a board body structure. The first component 10 has an extension section 11 (perpendicularly) protruding from the first component 10. A fixing hole 12 is formed on the extension section 11 for fixing a head end 31 of the fixing shaft 30, whereby the fixing shaft 30 is fixed without possibility of rotation. A seat section 32 is disposed on the fixing shaft 30. The seat section 32 includes two disc-shaped stopper walls 33, 34 and a cavity 35 positioned between the two stopper walls 33, 34. The stopper walls 33, 34 have a diameter (or a width) larger than the diameter of the fixing shaft 30. The seat section 32 is locally formed with a connection section 36 for connecting the two stopper walls 33, 34.

In this embodiment, the two stopper walls 33, 34 are respectively formed with notches 37, 38 in radial direction of the fixing shaft 30. The fixing shaft 30 is formed with a recess 39 corresponding to the notches 37, 38. The recess 39 communicates with the notches 37, 38 to together form a space for assembling an eccentric shaft 40 therein.

To speak more specifically, a rocking arm 50 is disposed in the cavity 35 between the two stopper walls 33, 34. The rocking arm 50 includes a first head end 51, a second head end 52 and a connection section 53 connecting the first and second head ends 51, 52 with each other. The cross-sectional area of the first and second head ends 51, 52 is larger than the cross-sectional area of the connection section 53, whereby a dented section 54 is formed between the first and second head ends 51, 52. The first head end 51 is formed with an assembling hole 55 for pivotally connecting with the eccentric shaft 40, whereby the rocking arm 50 is permitted to swing.

That is, when the first head end 51 of the rocking arm and the eccentric shaft 40 are arranged in the cavity 35 of the seat section 32, the eccentric shaft 40 is fixedly mounted in the notches 37, 38 of the stopper walls of the seat section 32 and the recess 39 of the fixing shaft 30. However, the second head end 52 of the rocking arm 50 is permitted to swing with the eccentric shaft 40 as a fulcrum.

In this embodiment, a fixing disc 45 is disposed on the fixing shaft 30 in a position in adjacency to the seat section 32. The fixing disc 45 has a shaft hole 46 and an eccentric hole 47 in communication with the shaft hole 46. A part of the shaft hole 46 communicates with a part of the eccentric hole 47 to together form a geometrical hole substantially in the form of a calabash. A head end 41 of the eccentric shaft 40 is pivotally connected in the eccentric hole 47 to help in fixing the eccentric shaft 40.

As shown in the drawings, the second head end 52 of the rocking arm is formed with a pivot hole 56 for pivotally connecting with a subsidiary shaft 60. The subsidiary shaft 60 includes a first section 61, a second section 62 and a middle section 63 connected between the first and second sections 61, 62. The diameter (or the width) of the middle section 63 is larger than the diameter (or the width) of the first section 61 or the second section 62. The first section 61 of the subsidiary shaft 60 is pivotally connected in the pivot hole 56 of the second head end 52 of the rocking arm. The second section 62 of the subsidiary shaft is assembled on the second component 20.

To speak more specifically, the second component 20 is a board body structure. The second component 20 has an extension section 21 (perpendicularly) protruding from the second component 20. A pivot hole 22 is formed on the extension section 21 for pivotally connecting with the second section 62 of the subsidiary shaft. A slot 23 is further formed on the extension section 21 for assembling with the fixing shaft 30. The slot 23 is defined with a first position 24 and a second position 25, whereby the fixing shaft 30 is relatively movable between the first and second positions 24, 25. The first position is a closed position where the first component 10 (or the apparatus body module 91) and the second component 20 (or the display module 92) contain an angle of zero degree and a position where the fixing shaft 30 (assembled with a bearing or a collar 95) is initially positioned in the slot 23. The second position is a position where the fixing shaft 30 is relatively positioned in the slot 23 after the second component 20 (or the display module 92) is rotated to an opened position to drive the slot 23 of the second component 20 to move.

In a modified embodiment, the extension section 21 of the second component is formed with a fixing hole 26 for pivotally connecting with and fixing a pin member 27. In addition, a first fixing plate 70 and a second fixing plate 80 are disposed on two sides of the extension section 21 of the second component. The first and second fixing plates 70, 80 are respectively formed with guide slots 71, 81 and shaft holes 72, 82. The second section 62 of the subsidiary shaft 60 is assembled in the guide slots 71, 81. That is, the second section 62 of the subsidiary shaft passes through the guide slot 71 of the first fixing plate 70 and the pivot hole 22 of the extension section 21 of the second component to assemble in the guide slot 81 of the second fixing plate 80.

Each of the guide slots 71, 81 is defined with a first position 73, 83 and a second position 74, 84. When the rocking arm 50 swings, the subsidiary shaft 60 (or the second section 62) is permitted to relatively move between the first and second positions 73, 83, 74, 84 of the guide slots. The first position 73, 83 is a position where the subsidiary shaft 60 (or the second section 62) is initially positioned in the guide slot 71, 81 when the first component 10 (or the apparatus body module 91) and the second component 20 (or the display module 92) are positioned in the closed position of zero degree. The second position 74, 84 is a position where the subsidiary shaft 60 (or the second section 62) is relatively positioned in the guide slot 71, 81 after the second component 20 (or the display module 92) is rotated to the opened position to drive the second component 20 and the subsidiary shaft 60 to move.

As shown in the drawings, the fixing shaft 30 is pivotally connected in the shaft holes 72, 82 of the first and second fixing plates 70, 80, whereby the first and second fixing plates 70, 80 can rotate around the fixing shaft 30 along with the motion of the rocking arm 50. The fixing shaft 30 is assembled in the shaft hole 72 of the first fixing plate, the slot 23 of the second component and the shaft hole 82 of the second fixing plate. Thereafter, a torque module 99 is assembled with the fixing shaft 30. Accordingly, when the action force for rotating the second component 20 (or the display module 92) disappears, the second component 20 is located.

In this embodiment, the first and second fixing plates 70, 80 are further formed with guiding slots 75, 85. The pin member 27 pivotally connected and fixed in the fixing hole 26 of the second component is assembled in the guiding slots 75, 85. Each of the guiding slots 75, 85 is defined with a first position 76, 86 and a second position 77, 87. When the second component 20 is moved along with the display module 92, the pin member 27 is permitted to relatively move between the first and second positions 76, 86, 77, 87 of the guiding slots 75, 85. The first position 76, 86 of the guiding slots is a position where the pin member 27 is initially positioned in the guiding slot 75, 85 when the first component 10 (or the apparatus body module 91) and the second component 20 (or the display module 92) are positioned in the closed position of zero degree. The second position 77, 87 of the guiding slots is a position where the pin member 27 is relatively positioned in the guiding slot 75, 85 after the second component 20 (or the display module 92) is rotated to the opened position to drive the second component 20 and the pin member 27 to move.

Figure 4:
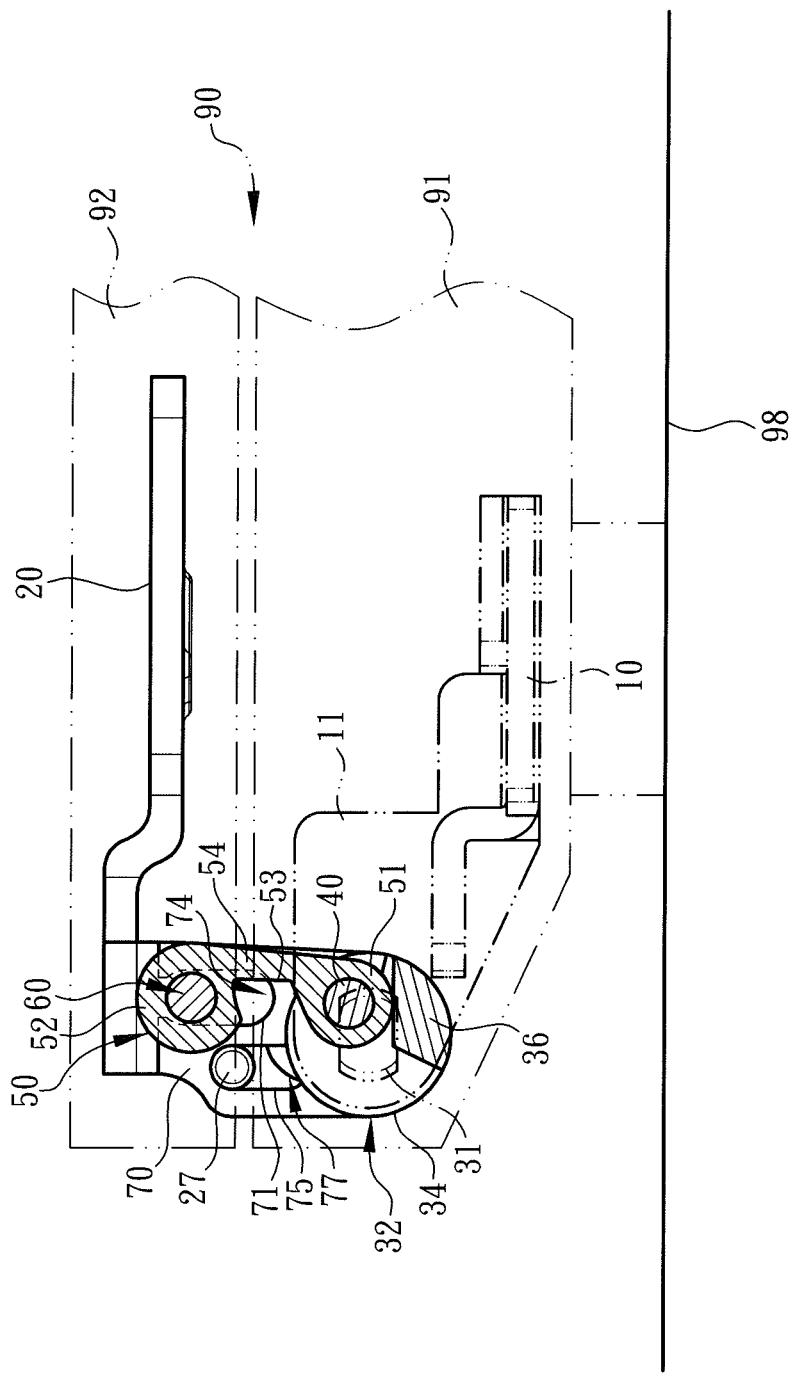
FIG. 4 is a plane view according to FIG. 3, showing that the subsidiary shaft is cooperatively positioned in the first position of the guide slot.

Please refer to FIGS. 3 and 4. The first and second components 10, 20 are respectively assembled with the apparatus body module 91 and the display module 92 and are positioned in the zero degree position in a closed state. At this time, the fixing shaft 30 is positioned in the first position 24 of the slot 23 of the second component, the subsidiary shaft 60 (or the second section 62) is positioned in the first position 73, 83 of the guide slot 71, 81 and the pin member 27 is positioned in the first position 76, 86 of the guiding slot 75, 85.

Figure 5:
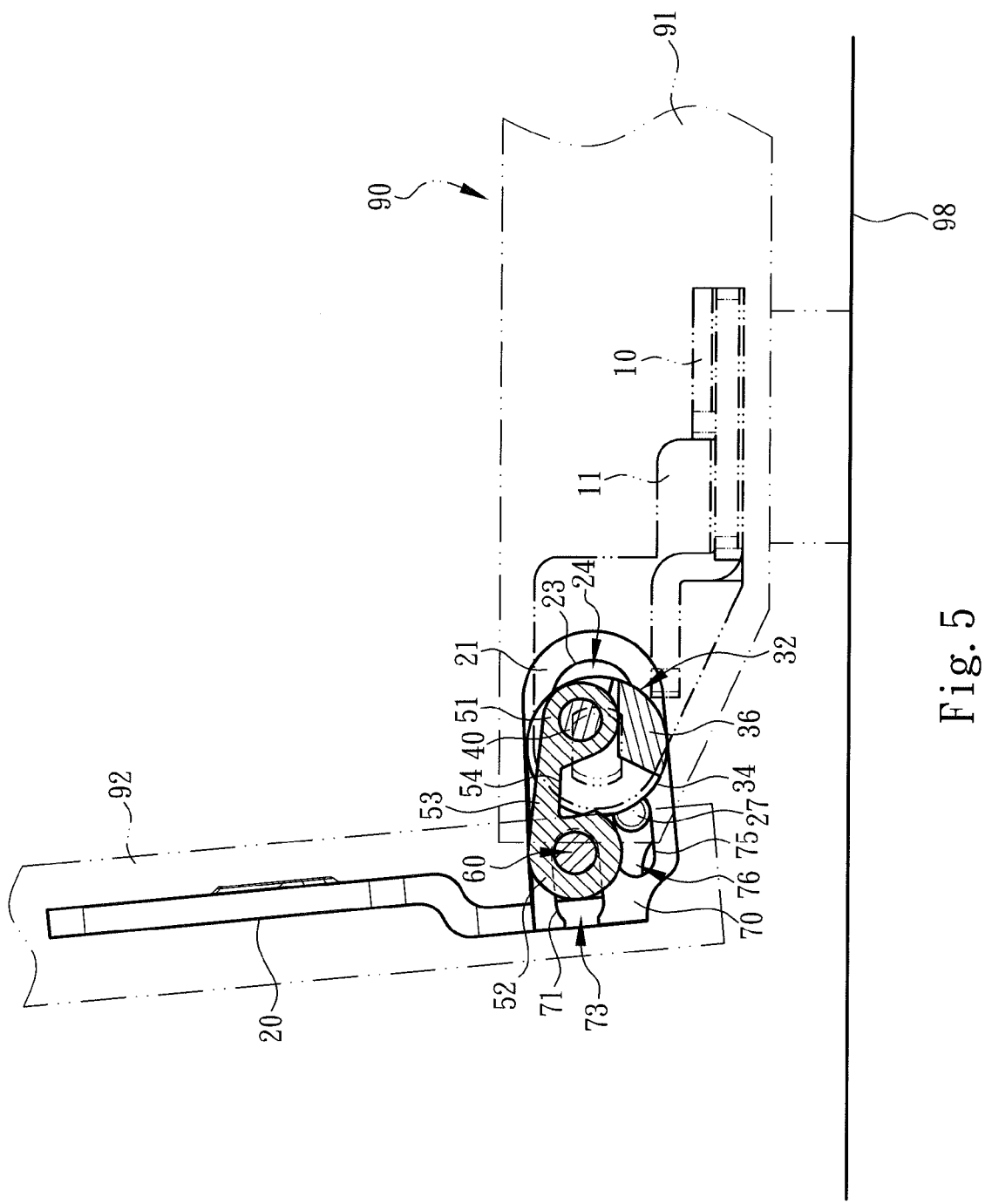
FIG. 5 is an operation view according to FIG. 4, showing that the display module drives the second component to rotate to the opened position by 95 degrees and the fixing shaft relatively moves from the first position of the slot to the second position of the slot and the subsidiary shaft relatively moves from the first position of the guide slot to the second position of the guide slot.

Please refer to FIG. 5. When a user operates the display module 92 to drive the second component 20 to move to the opened position by 95 degrees, the respective parts are moved in the following manner:

1. The subsidiary shaft 60 is moved along with the second component 20, whereby the first section 61 of the subsidiary shaft drives the second head end 52 of the rocking arm to swing around the first head end 51 and the eccentric shaft 40 as a fulcrum.
2. The slot 23 is moved along with the rotation of the second component 20, whereby the fixing shaft 30 is relatively moved from the first position 24 of the slot to the second position 25 of the slot. This is because when the second component 20, the subsidiary shaft 60 and the rocking arm 50 are rotated around the fixing shaft 30 with the eccentric shaft 40 as the fulcrum, the relative position and shaft distance between the subsidiary shaft 60 and the fixing shaft 30 are changed. In the case that the shaft distance between the subsidiary shaft 60 and the fixing shaft 30 is set fixed and unchanged, in response to the change of the relative position and shaft distance between the subsidiary shaft 60 and the fixing shaft 30, the rocking arm 50 and the subsidiary shaft 60 are forced to pull the second component 20 to move, whereby the fixing shaft 30 is relatively moved from the first position 24 of the slot to the second position 25 of the slot.
3. The subsidiary shaft 60 (or the second section 62) also drives the first fixing plate 70 and the second fixing plate 80 to rotate around the fixing shaft 30 as a fulcrum. In addition, the second section 62 of the subsidiary shaft relatively moves from the first position 73, 83 of the guide slot to the second position 74, 84 of the guide slot.
4. The pin member 27 relatively moves from the first position 76, 86 of the guiding slot to the second position 77, 87 of the guiding slot along with the motion of the second component 20.

Figure 6:
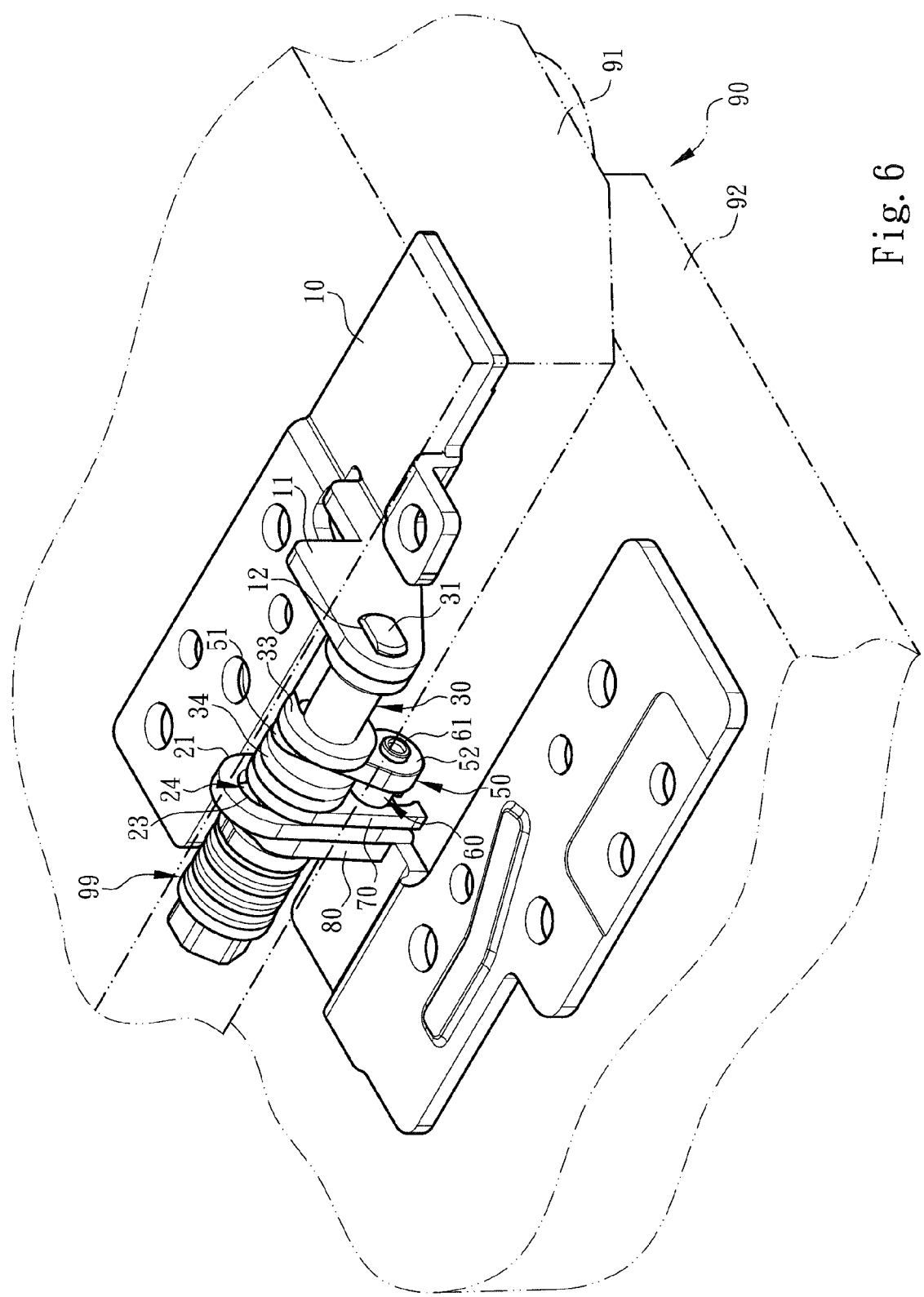
FIG. 6 is another operation view of the present invention, showing that the display module drives the second component to rotate to the opened position by 180 degrees.
Figure 7:
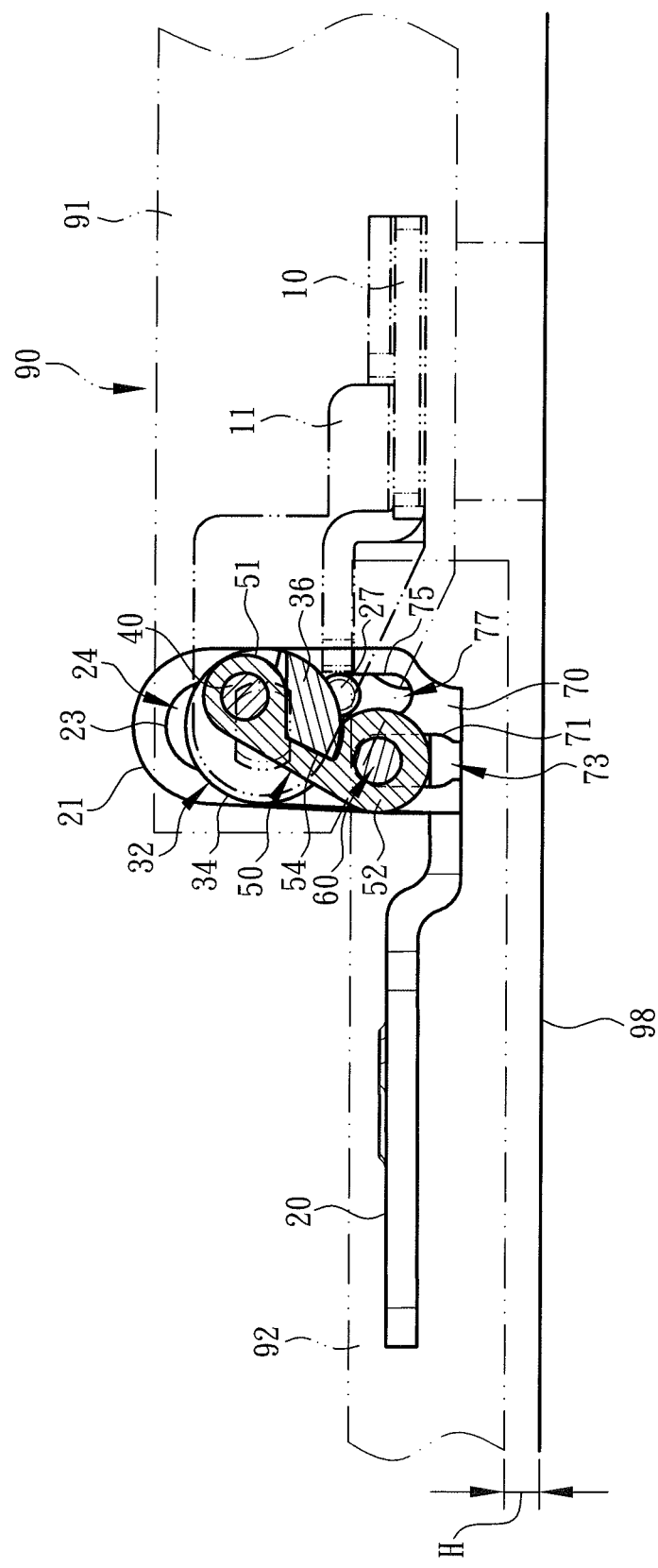
FIG. 7 is a plane view according to FIG. 6, showing that the display module is positioned in a (fully) opened position of 180 degrees and is spaced from the hard face, the horizontal base face or the table face by a set height.

Please refer to FIGS. 6 and 7. When the display module 92 drives the second component 20 to rotate to the (fully) opened position by 180 degrees, the dented section 54 of the rocking arm will be blocked by the connection section 36 of the seat section 32, whereby the display module 92 and the second component 20 cannot be further rotated and are truly located. In this case, the display module 92 is prevented from being over-rotated to hit a base face 98, a hard face, a table face or the like.

FIG. 7 especially shows that in the display module 92, the rocking arm 50 and the subsidiary shaft 60 pull the second component 20 to move so that the fixing shaft 30 relatively moves from the first position 24 of the slot to the second position 25 of the slot. (The second section 62 of the subsidiary shaft relatively moves from the first position 73, 83 of the guide slot to the second position 74, 84 of the guide slot and the pin member 27 relatively moves from the first position 76, 86 of the guiding slot to the second position 77, 87 of the guiding slot). Therefore, a safety distance or a set height H is formed between the display module 92 and the base face 98.

It should be noted that the safety distance or height H between the display module 92 and the base face 98 is set to be approximately equal to the moving distance of the fixing shaft 30 within the slot 23 (between the first and second positions 24, 25) or approximately equal to the moving distance of the second section 62 of the subsidiary shaft within the guide slots 71, 81 (between the first and second positions 73, 83, 74, 84).

The pivot pin device of the present invention can be conveniently operated/rotated and located. In comparison with the conventional device, the pivot pin device of the present invention has the following advantages:

1. The pivot pin device and the relevant components/structures have been redesigned to be different from the conventional device. The usage and operation form of the pivot pin device are changed. For example, the fixing shaft 30 is disposed on the first component 10. The second component 20 is formed with the corresponding slot 23 for assembling with the fixing shaft 30. The fixing shaft 30 is permitted to relatively move within the slot between the first and second positions 24, 25. The seat section 32 is disposed on the fixing shaft 30. The seat section 32 is formed with a cavity 35 for assembling with the rocking arm 50. The first head end 51 of the rocking arm is pivotally connected with the eccentric shaft 40, whereby the second head end 52 of the rocking arm can swing. The seat section 32 is formed with the notches 37, 38 and the fixing shaft 30 is formed with the cooperative recess 39. The fixing disc 45 mounted on the fixing shaft 30 is formed with the eccentric hole 47 for together assembling with the eccentric shaft 40. The second component 20 is pivotally connected with the subsidiary shaft 60. The subsidiary shaft 60 can drive the rocking arm 50 along with the motion of the second component 20. The seat section 32 is formed with the connection section 36 and the rocking arm 50 is formed with the cooperative dented section 54 for restricting the motional range of the rocking arm 50 and the second component 20 (or the display module 92). The first and second fixing plates 70, 80 are respectively formed with the shaft holes 72, 82 and the guide slots 71, 81 for assembling with the fixing shaft 30, whereby the subsidiary shaft 60 is permitted to relatively move within the guide slots 71, 81 between the first positions 73, 83 and the second positions 74, 84. The second component 20 is pivotally connected with the pin member 27. The pin member 27 is relatively movable along with the second component 20 within the guiding slots 75, 85 between the first positions 76, 86 and the second positions 77, 87. Substantially, the pivot pin device of the present invention is obviously different from the conventional device and the safety in operation is enhanced.

2. Especially, when the display module 92 drives the second component 20 to rotate to the opened position, the second component 20, the subsidiary shaft 60 and the rocking arm 50 are rotated around the fixing shaft 30 with the eccentric shaft 40 as the fulcrum. At this time, the relative position and shaft distance between the subsidiary shaft 60 and the fixing shaft 30 are changed. The rocking arm 50 and the subsidiary shaft 60 are forced to pull the second component 20 to move, whereby the display module 92 is automatically lifted by a safety distance and a set height H is formed between the display module 92 and the base face 98. Therefore, in operation/rotation of the pivot pin device, the relative height or position of the display module 92 is automatically changed to set up a protection or safety system. This obviously improves the shortcoming of the conventional device that in operation, due to negligence or incaution, the display often hits the table face or some other hard objects to damage the display or scrape the surface of the display.

In conclusion, the pivot pin device of the present invention is effective and different from the conventional pivot pin device in space form. The pivot pin device of the present invention is inventive and greatly advanced and advantageous over the conventional pivot pin device.

The above embodiments are only used to illustrate the present invention, not intended to limit the scope thereof. Many modifications of the above embodiments can be made without departing from the spirit of the present invention.

What is claimed is:

1. A pivot pin device comprising:
    a first component, a fixing shaft being disposed on the first component; and
    a second component formed with a slot for assembling with the fixing shaft, the slot being defined with a first position and a second position, a seat section being disposed on the fixing shaft for assembling with a rocking arm, the rocking arm having a first head end and a second head end, the first head end being pivotally connected to the seat section with an eccentric shaft, the second head end being pivotally connected with a subsidiary shaft assembled on the second component, when the second component is rotated relative to the first component, the subsidiary shaft driving the rocking arm to swing with the eccentric shaft as a fulcrum, whereby the fixing shaft is relatively moved within the slot between the first and second positions to forma height difference between the first component and the second component with respect to a supporting base face.

2. The pivot pin device as claimed in claim 1, wherein the first component is a board body structure, the first component having an extension section protruding from the first component, a fixing hole being formed on the extension section for fixing a head end of the fixing shaft, the second component being a board body structure, the second component having an extension section protruding from the second component, the slot being formed on the extension section of the second component, the seat section including two stopper walls and a cavity positioned between the two stopper walls, the seat section being locally formed with a connection section for connecting the two stopper walls, the rocking arm being disposed in the cavity between the two stopper walls.

3. The pivot pin device as claimed in claim 2, wherein the stopper walls are disc-shaped, the stopper walls having a width larger than a diameter of the fixing shaft, the two stopper walls being respectively formed with notches in radial direction of the fixing shaft for assembling with the eccentric shaft, the rocking arm including a connection section connected between the first and second head ends, a cross-sectional area of the first and second head ends being larger than a cross-sectional area of the connection section, whereby a dented section is formed between the first and second head ends, the first head end being formed with an assembling hole for pivotally connecting with the eccentric shaft, whereby the rocking arm is permitted to swing.

4. The pivot pin device as claimed in claim 3, wherein the fixing shaft is formed with a recess corresponding to the notches of the two stopper walls, the recess communicating with the notches of the two stopper walls to together form a space for assembling the eccentric shaft therein, the first head end of the rocking arm and the eccentric shaft being arranged in the cavity of the seat section, the eccentric shaft being fixedly mounted in the notches of the two stopper walls of the seat section and the recess of the fixing shaft, the second head end of the rocking arm being permitted to swing with the eccentric shaft as a fulcrum.

5. The pivot pin device as claimed in claim 1, wherein a fixing disc is disposed on the fixing shaft in a position in adjacency to the seat section, the fixing disc having a shaft hole and an eccentric hole in communication with the shaft hole, a part of the shaft hole of the fixing disc communicating with a part of the eccentric hole to together form a geometrical hole substantially in the form of a calabash, a head end of the eccentric shaft being pivotally connected in the eccentric hole.

6. The pivot pin device as claimed in claim 2, wherein a fixing disc is disposed on the fixing shaft in a position in adjacency to the seat section, the fixing disc having a shaft hole and an eccentric hole in communication with the shaft hole, a part of the shaft hole of the fixing disc communicating with a part of the eccentric hole to together form a geometrical hole substantially in the form of a calabash, a head end of the eccentric shaft being pivotally connected in the eccentric hole.

7. The pivot pin device as claimed in claim 3, wherein a fixing disc is disposed on the fixing shaft in a position in adjacency to the seat section, the fixing disc having a shaft hole and an eccentric hole in communication with the shaft hole, a part of the shaft hole of the fixing disc communicating with a part of the eccentric hole to together form a geometrical hole substantially in the form of a calabash, a head end of the eccentric shaft being pivotally connected in the eccentric hole.

8. The pivot pin device as claimed in claim 4, wherein a fixing disc is disposed on the fixing shaft in a position in adjacency to the seat section, the fixing disc having a shaft hole and an eccentric hole in communication with the shaft hole, a part of the shaft hole of the fixing disc communicating with a part of the eccentric hole to together form a geometrical hole substantially in the form of a calabash, a head end of the eccentric shaft being pivotally connected in the eccentric hole.

9. The pivot pin device as claimed in claim 1, wherein the second head end of the rocking arm is formed with a pivot hole for pivotally connecting with the subsidiary shaft, the subsidiary shaft including a first section, a second section and a middle section connected between the first and second sections, a width of the middle section being larger than a width of the first section or the second section, the extension section of the second component being formed with a pivot hole for pivotally connecting with the second section of the subsidiary shaft, the first section of the subsidiary shaft being pivotally connected in the pivot hole of the rocking arm, the second section of the subsidiary section being assembled on the second component.

10. The pivot pin device as claimed in claim 2, wherein the second head end of the rocking arm is formed with a pivot hole for pivotally connecting with the subsidiary shaft, the subsidiary shaft including a first section, a second section and a middle section connected between the first and second sections, a width of the middle section being larger than a width of the first section or the second section, the extension section of the second component being formed with a pivot hole for pivotally connecting with the second section of the subsidiary shaft, the first section of the subsidiary shaft being pivotally connected in the pivot hole of the rocking arm, the second section of the subsidiary section being assembled on the second component.

11. The pivot pin device as claimed in claim 3, wherein the second head end of the rocking arm is formed with a pivot hole for pivotally connecting with the subsidiary shaft, the subsidiary shaft including a first section, a second section and a middle section connected between the first and second sections, a width of the middle section being larger than a width of the first section or the second section, the extension section of the second component being formed with a pivot hole for pivotally connecting with the second section of the subsidiary shaft, the first section of the subsidiary shaft being pivotally connected in the pivot hole of the rocking arm, the second section of the subsidiary section being assembled on the second component.

12. The pivot pin device as claimed in claim 4, wherein the second head end of the rocking arm is formed with a pivot hole for pivotally connecting with the subsidiary shaft, the subsidiary shaft including a first section, a second section and a middle section connected between the first and second sections, a width of the middle section being larger than a width of the first section or the second section, the extension section of the second component being formed with a pivot hole for pivotally connecting with the second section of the subsidiary shaft, the first section of the subsidiary shaft being pivotally connected in the pivot hole of the rocking arm, the second section of the subsidiary section being assembled on the second component.

13. The pivot pin device as claimed in claim 5, wherein the second head end of the rocking arm is formed with a pivot hole for pivotally connecting with the subsidiary shaft, the subsidiary shaft including a first section, a second section and a middle section connected between the first and second sections, a width of the middle section being larger than a width of the first section or the second section, the extension section of the second component being formed with a pivot hole for pivotally connecting with the second section of the subsidiary shaft, the first section of the subsidiary shaft being pivotally connected in the pivot hole of the rocking arm, the second section of the subsidiary section being assembled on the second component.

14. The pivot pin device as claimed in claim 6, wherein the second head end of the rocking arm is formed with a pivot hole for pivotally connecting with the subsidiary shaft, the subsidiary shaft including a first section, a second section and a middle section connected between the first and second sections, a width of the middle section being larger than a width of the first section or the second section, the extension section of the second component being formed with a pivot hole for pivotally connecting with the second section of the subsidiary shaft, the first section of the subsidiary shaft being pivotally connected in the pivot hole of the rocking arm, the second section of the subsidiary section being assembled on the second component.

15. The pivot pin device as claimed in claim 7, wherein the second head end of the rocking arm is formed with a pivot hole for pivotally connecting with the subsidiary shaft, the subsidiary shaft including a first section, a second section and a middle section connected between the first and second sections, a width of the middle section being larger than a width of the first section or the second section, the extension section of the second component being formed with a pivot hole for pivotally connecting with the second section of the subsidiary shaft, the first section of the subsidiary shaft being pivotally connected in the pivot hole of the rocking arm, the second section of the subsidiary section being assembled on the second component.

16. The pivot pin device as claimed in claim 8, wherein the second head end of the rocking arm is formed with a pivot hole for pivotally connecting with the subsidiary shaft, the subsidiary shaft including a first section, a second section and a middle section connected between the first and second sections, a width of the middle section being larger than a width of the first section or the second section, the extension section of the second component being formed with a pivot hole for pivotally connecting with the second section of the subsidiary shaft, the first section of the subsidiary shaft being pivotally connected in the pivot hole of the rocking arm, the second section of the subsidiary section being assembled on the second component.

17. The pivot pin device as claimed in claim 2, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

18. The pivot pin device as claimed in claim 3, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

19. The pivot pin device as claimed in claim 4, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

20. The pivot pin device as claimed in claim 5, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

21. The pivot pin device as claimed in claim 6, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

22. The pivot pin device as claimed in claim 7, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

23. The pivot pin device as claimed in claim 8, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

24. The pivot pin device as claimed in claim 9, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the second section of the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

25. The pivot pin device as claimed in claim 10, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the second section of the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

26. The pivot pin device as claimed in claim 11, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the second section of the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the second section of the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

27. The pivot pin device as claimed in claim 12, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the second section of the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

28. The pivot pin device as claimed in claim 13, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the second section of the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

29. The pivot pin device as claimed in claim 14, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the second section of the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

30. The pivot pin device as claimed in claim 15, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the second section of the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

31. The pivot pin device as claimed in claim 16, wherein the extension section of the second component is formed with a fixing hole for pivotally connecting with and fixing a pin member, a first fixing plate and a second fixing plate being disposed on two sides of the extension section of the second component, the first and second fixing plates being respectively formed with guide slots and shaft holes, the second section of the subsidiary shaft being assembled in the guide slots, the subsidiary shaft passing through the guide slot of the first fixing plate and the extension section of the second component to assemble in the guide slot of the second fixing plate, each of the guide slots of the first and second fixing plates being defined with a first position and a second position, the subsidiary shaft being permitted to relatively move between the first and second positions of the guide slots, the fixing shaft being pivotally connected in the shaft holes of the first and second fixing plates, whereby the first and second fixing plates can rotate around the fixing shaft along with the motion of the rocking arm, the first and second fixing plates being further formed with guiding slots, the pin member pivotally connected and fixed in the fixing hole of the second component being assembled in the guiding slots, each of the guiding slots being defined with a first position and a second position, the pin member being permitted to relatively move between the first and second positions of the guiding slots.

32. The pivot pin device as claimed in claim 1, wherein the fixing shaft is assembled with a torque module, the first and second components being respectively assembled with an apparatus body module and a display module of an electronic apparatus, when the display module drives the second component to rotate to an opened position by 180 degrees, a set height being formed between the display module and the supporting base face, the set height being equal to a moving distance of the fixing shaft within the slot.

33. The pivot pin device as claimed in claim 17, wherein the fixing shaft is assembled with a torque module, the first and second components being respectively assembled with an apparatus body module and a display module of an electronic apparatus, when the display module drives the second component to rotate to an opened position by 180 degrees, a set height being formed between the display module and the supporting base face, the set height being equal to a moving distance of the fixing shaft within the slot and the set height being equal to a moving distance of the subsidiary shaft within the guide slot.

* * * * *